(12) United States Patent
Frosolone

(10) Patent No.: US 7,474,225 B2
(45) Date of Patent: Jan. 6, 2009

(54) FRESH WATER INTAKE MONITORING SYSTEM AND METHOD

(75) Inventor: Frank J. Frosolone, South Elgin, IL (US)

(73) Assignee: J.F. Aquatics, South Elgin, IL (US)

( * ) Notice: Subject to any disclaimer, the term of this patent is extended or adjusted under 35 U.S.C. 154(b) by 293 days.

(21) Appl. No.: 11/227,343

(22) Filed: Sep. 15, 2005

(65) Prior Publication Data

US 2006/0124172 A1 Jun. 15, 2006

Related U.S. Application Data

(60) Provisional application No. 60/636,087, filed on Dec. 14, 2004.

(51) Int. Cl.
*G08B 13/00* (2006.01)
(52) U.S. Cl. ............... 340/573.6; 340/573.1; 73/432.1; 73/864.91
(58) Field of Classification Search ............... 340/573.6
See application file for complete search history.

(56) References Cited

U.S. PATENT DOCUMENTS

| | | | | |
|---|---|---|---|---|
| 6,101,759 | A * | 8/2000 | Power | 43/55 |
| 6,245,224 | B1 | 6/2001 | Enoki et al. | |
| 6,988,394 | B2 * | 1/2006 | Shedd et al. | 73/61.41 |
| 2001/0011642 | A1 | 8/2001 | Fukunaga et al. | |
| 2002/0054234 | A1 * | 5/2002 | Patel et al. | 348/373 |
| 2002/0116779 | A1 * | 8/2002 | Vogt | 15/250.04 |
| 2004/0020862 | A1 | 2/2004 | Baca et al. | |
| 2005/0251367 | A1 * | 11/2005 | Kahn et al. | 702/188 |

FOREIGN PATENT DOCUMENTS

WO   WO 03/104572   12/2003

OTHER PUBLICATIONS

Clifford Megerle, System fro Protection of biulding water supplies Against Chemical and Biological Warefare Agents, WO 01/09041.*

* cited by examiner

*Primary Examiner*—Jeff Hofsass
*Assistant Examiner*—Ojiako Nwugo
(74) *Attorney, Agent, or Firm*—Gerald E. Helget; Nelson R. Capes; Briggs and Morgan P.A.

(57) ABSTRACT

A system and method for continuously monitoring the intake of a fresh water system to detect pathogens, chemicals, and other biological contaminants. The apparatus consists of a number of monitoring and containment facilities which are inserted into a fresh water intake pipe at various locations. The monitoring and containment facilities detect a hazard in the incoming water, send a signal to shut down the main intake pump, and collect samples of water immediately adjacent the monitoring and containment facility that detected the hazard. A signal may also be sent to a regulatory agency and to the Department of Homeland Security. The method consists of conducting a qualitative and quantitative analysis of water in a fresh water intake pipe; testing for hazards, and shutting down the main intake pump if a sufficient level of hazard is detected. The method also consists of collecting water samples for later analysis and of notifying the appropriate agencies.

20 Claims, 9 Drawing Sheets

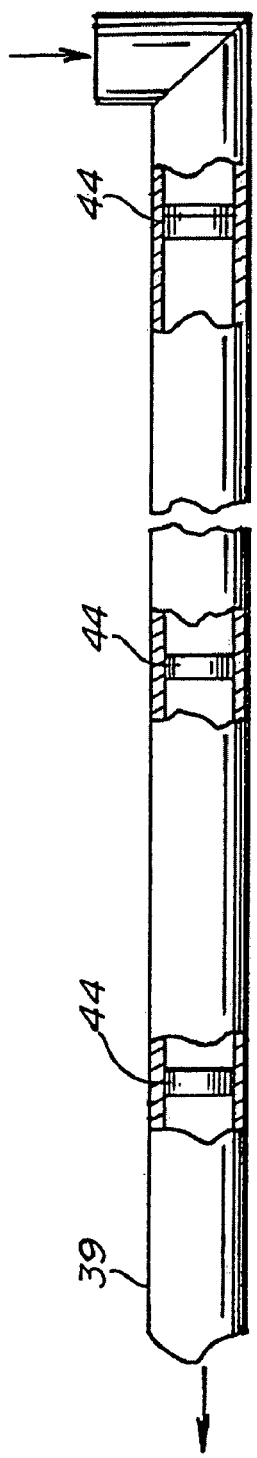
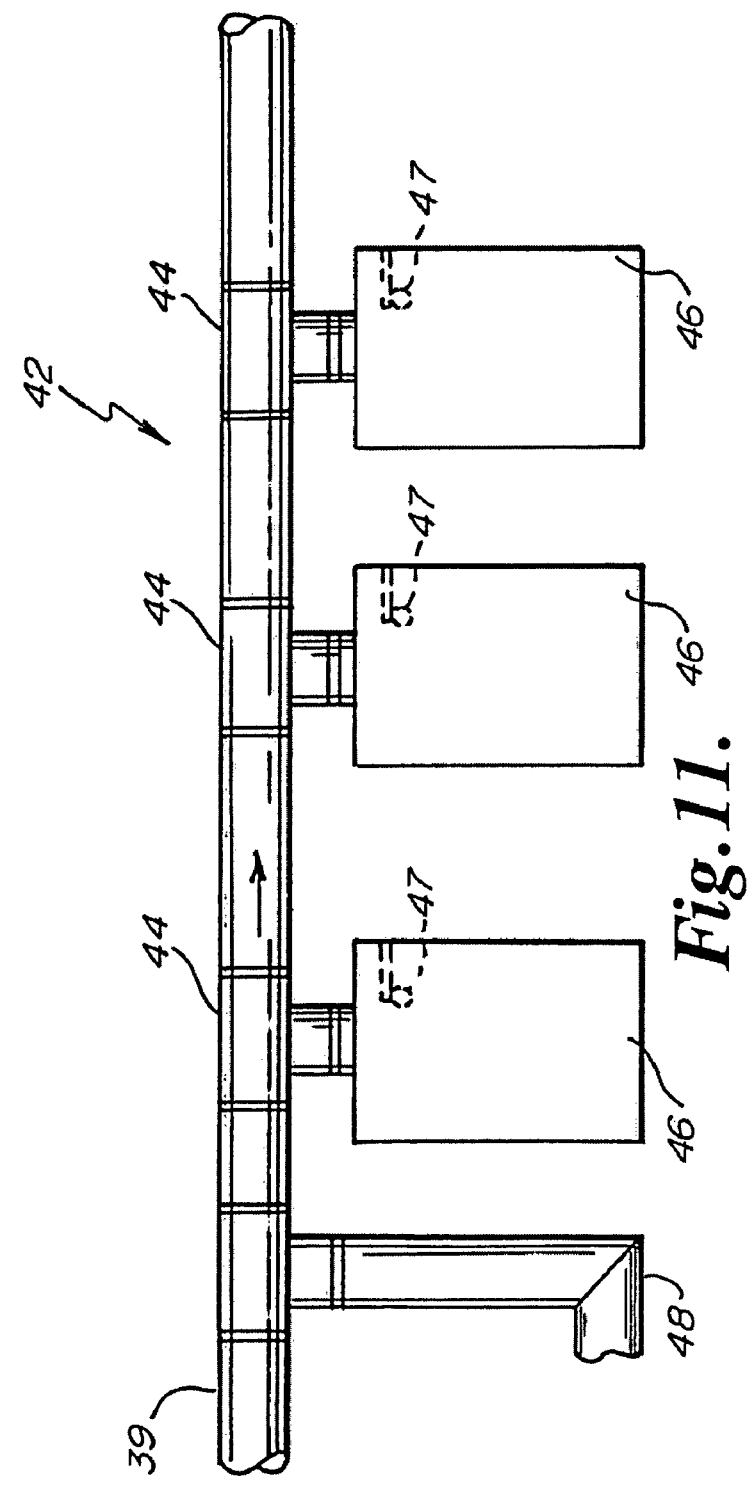

US 7,474,225 B2

FRESH WATER INTAKE MONITORING SYSTEM AND METHOD

This application is a continuation-in-part of application Ser. No. 60/636,087, filed on Dec. 14, 2004, entitled "FRESH WATER INTAKE MONITORING SYSTEM".

BACKGROUND OF THE INVENTION

The present invention relates to a system for continuously monitoring the intake of a municipal fresh water system to detect pathogens, chemicals, and other biological contaminants, and to automatically shut down the intake system and contain samples of contaminants at the point of detection.

With the rise of terrorism in the world, the likelihood of an attempt to contaminate a municipality's fresh water supply is quite high.

"Nearly all known biological warfare agents are intended for aerosol application. Although less effective as potable water threats, many are potentially capable of inflicting heavy casualties when ingested. Significant loss of mission capability can be anticipated even when complete recovery is possible. Properly maintained field army water purification equipment can counter this threat, but personnel responsible for the operation and maintenance of the equipment may be most at risk of exposure. Municipal water treatment facilities would be measurably less effective. Some replicating (infectious) agents and a few biotoxins are inactivated by chlorine disinfection; for others chlorine is ineffective or of unknown efficacy." *Environmental Health Perspectives,* Vol. 107, N. 12 (December 1999)

On Oct. 18, 2004, President George W. Bush signed the FY 2005 Homeland Security Appropriations Act, which provides $28.9 billion in net discretionary spending for the Department of Homeland Security (DHS). The Act, among other things, increases the U.S. Coast Guard's budget by 9 percent. In addition to maintaining its ongoing mission, the budget provides over $100 million to support the implementation of the Maritime Transportation Security Act, which will increase the Coast Guard's ability to develop, review and approve vessel and port security plans, improve underwater detection capabilities, and increase the intelligence program. The Act also provides $11 million to integrate, in real-time, bio-surveillance data collected from sensors throughout the country and fuse the data with information from health and agricultural surveillance and other terrorist-threat information from the law enforcement and intelligence communities.

There is a need for a system and method to monitor and thwart terrorists' attempts to contaminate municipal water supplies.

SUMMARY OF THE INVENTION

A system and method for continuously monitoring the intake of a municipal fresh water system to detect pathogens, chemicals, and other biological contaminants. The apparatus consists of a number of monitoring and containment facilities which are inserted into a fresh water intake pipe at various locations. The monitoring and containment facilities detect a hazard in the incoming water, send a signal to shut down the main intake pump, and collect samples of water immediately adjacent the monitoring and containment facility that detected the hazard. A signal is also sent to a regulatory agency and to the Department of Homeland Security. The method consists of conducting a qualitative and quantitative analysis of water in a fresh water intake pipe; testing for hazards, and shutting down the main intake pump if a sufficient level of hazard is detected. The method also consists of collecting water samples for later analysis and of notifying the appropriate agencies.

BRIEF DESCRIPTION OF DRAWINGS

FIG. 9 is a schematic of a discharge pipe of the present invention.

FIG. 11 is a schematic of the collection unit of the present invention.

DETAILED DESCRIPTION OF THE PREFERRED EMBODIMENT

Figure 1:
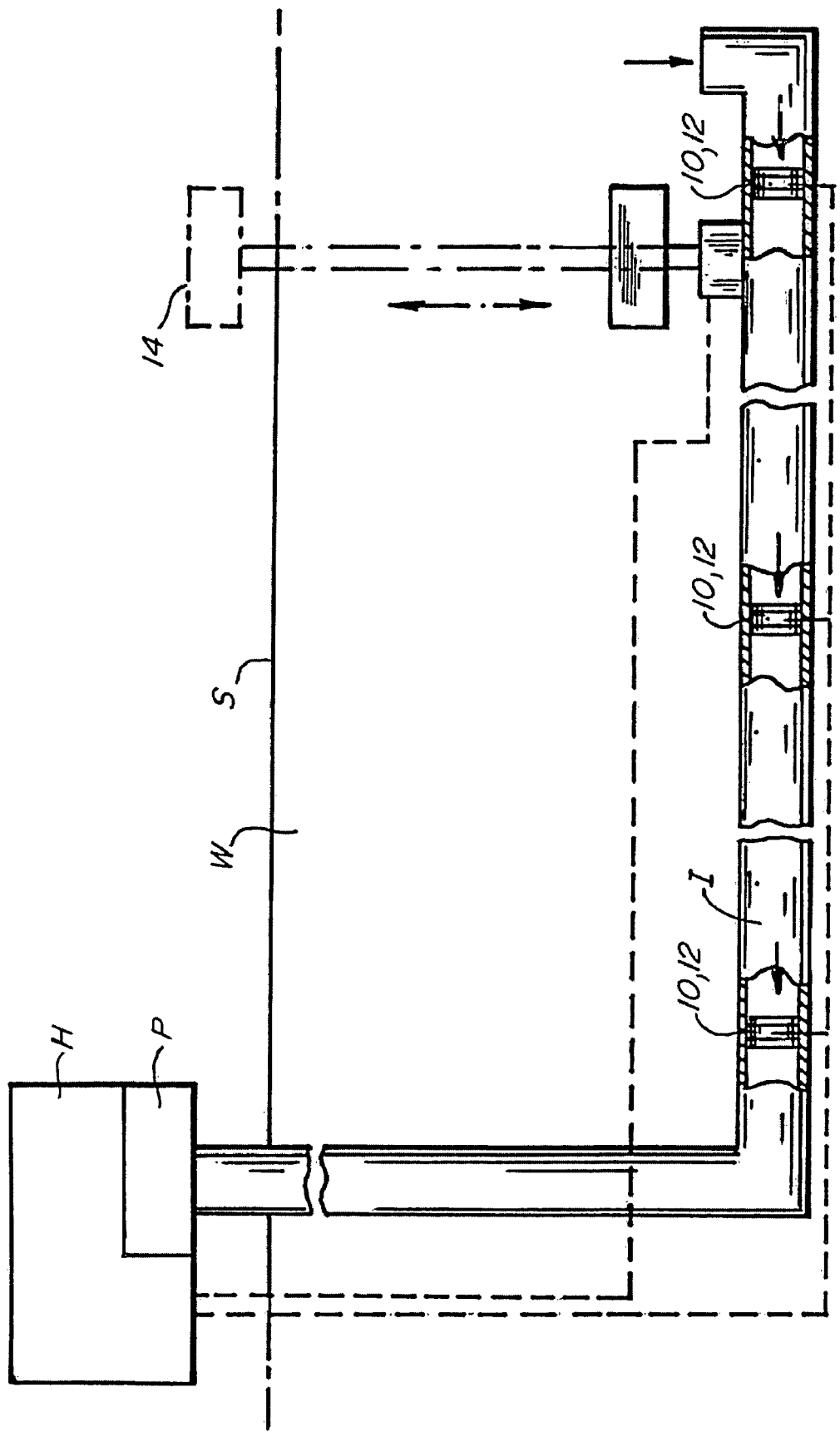
FIG. 1 is a schematic of a municipal fresh water intake system with the invention in place.

The present invention is generally shown in the Figures as reference numeral 10.

The fresh water intake monitoring system 10 comprises a number of monitoring and containment assemblies 12 located within a fresh water intake pipe I. In addition, a video camera 14 can be raised and lowered between the water's surface S and the vicinity of the pipe P, as shown in FIG. 1.

Figure 3:
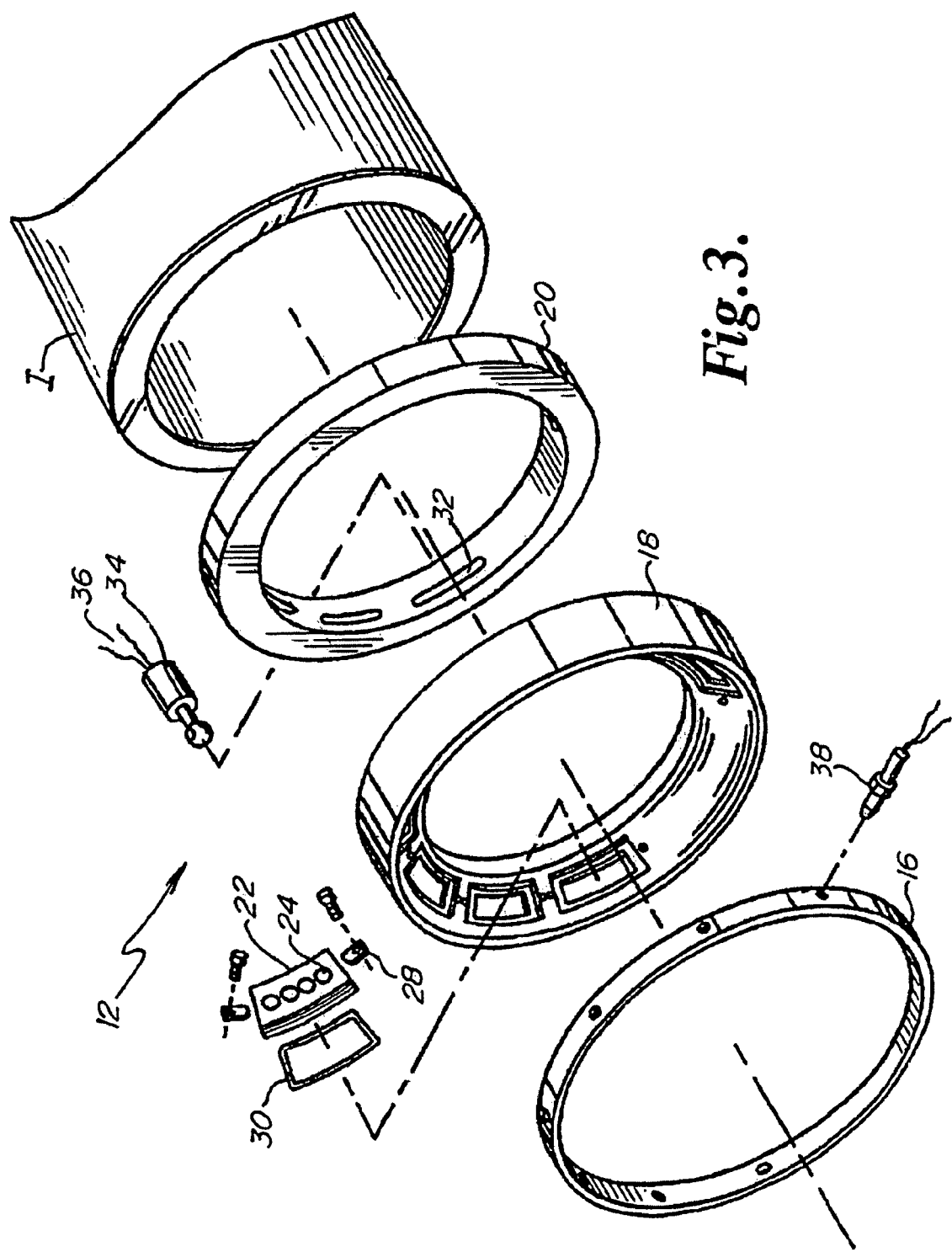
FIG. 3 is an exploded perspective view of the components of FIG. 2.

FIG. 3 is an exploded view of a monitoring and containment assembly 12. As seen, the monitoring and containment facility 12 preferably further comprises a propulsion unit 16, a monitoring unit 18, and a sampling unit 20. Each monitoring and containment assembly 12 may be of any shape or size to match the shape or size of the fresh water intake pipe I. In the drawings, the pipe P and the assemblies 12 are shown to be cylindrical, but this should not be viewed as a limitation.

Figure 2:
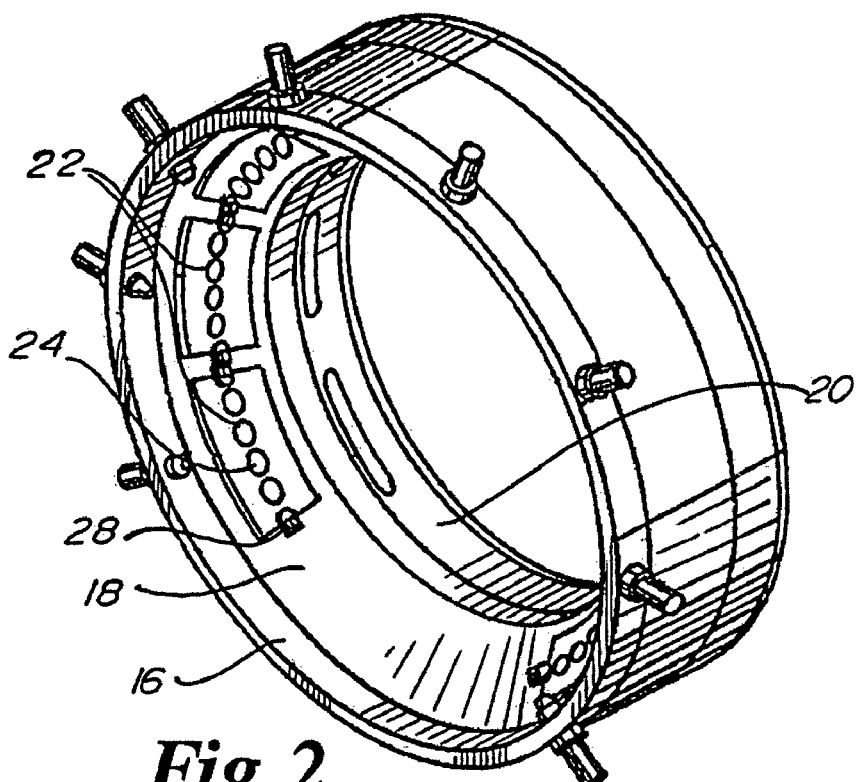
FIG. 2 is a perspective view of the combined monitoring unit, propulsion unit, and sampling unit of the present invention.
Figure 4:
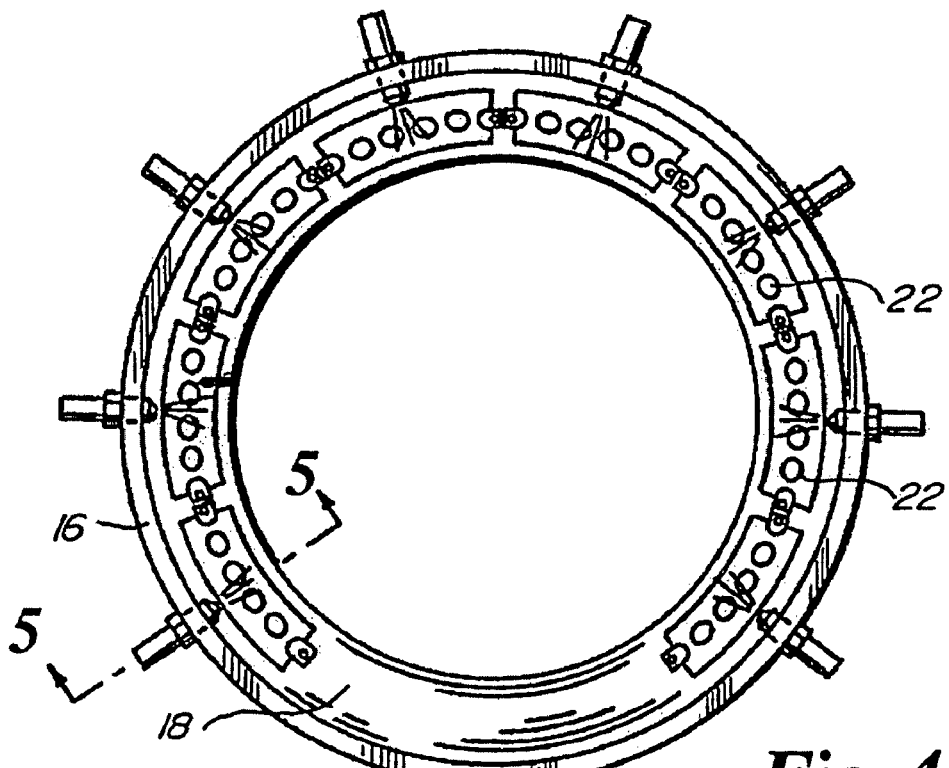
FIG. 4 is front elevation view of the components of FIG. 3.

As best seen in FIGS. 2, 3 and 4, each monitoring unit 18 further comprises at least one, and preferably a number of, sensor plates 22. As seen in FIGS. 7A-7D, each sensor plate 22 further comprises a number of sensors 24 arranged thereon. As shown in the Figures, the sensor plates 22 are trapezoidal, but this shape is not limiting. Any other shape (circular, square, polygonal, etc.) may also be used. The sensors are shown as round or square, but again these shapes should not be viewed as limiting.

Any sensor that detects the presence of a contaminant may be employed in the invention. For example, but without exclusivity, a sensor may detect the presence of a biological contaminant such as biological warfare agent. One type of sensor for detecting such an agent is disclosed in U.S. Pat. No. 6,569,384, herein incorporated by reference. However, a sensor may detect any other type of contaminant.

Figure 7A:
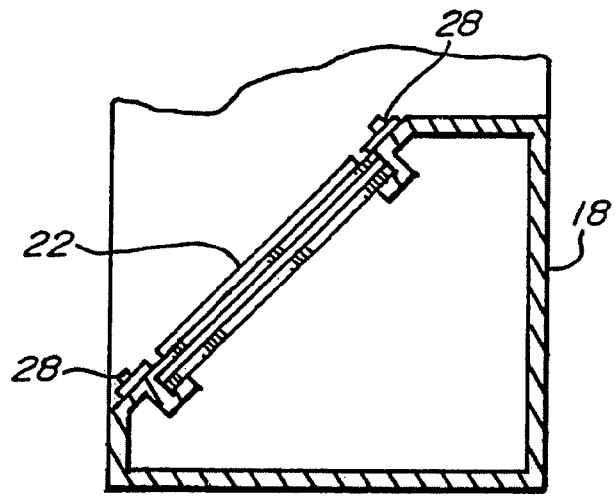
FIG. 7A is a schematic cross section of the monitoring unit of the present invention.
Figure 7B:
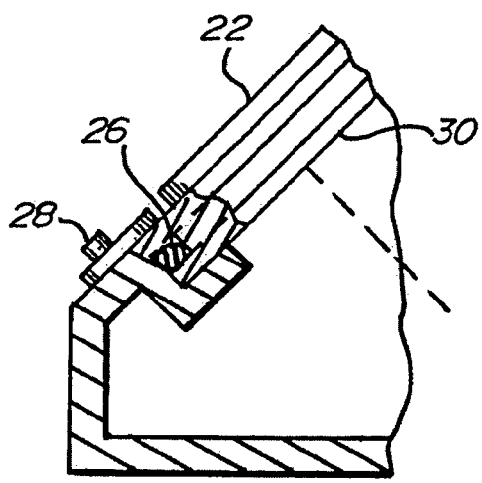
FIG. 7B is a detail of FIG. 7A.
Figure 7C:
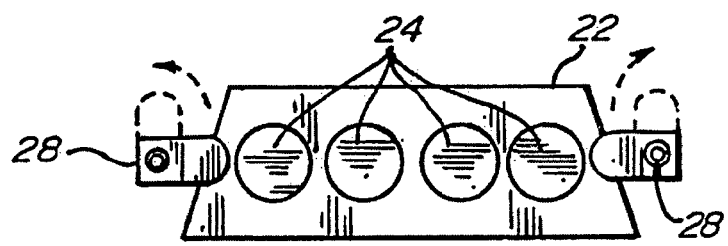
FIGS. 7C and 7D are top plan schematic views of universal, interchangeable sensor plates attachable to the monitoring unit of FIG. 7A.
Figure 7D:
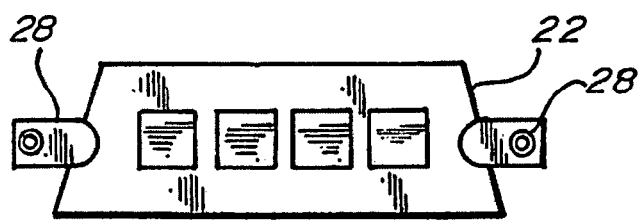

Also as seen in FIGS. 7A-7D, each of the sensor plates 22 is preferably removable from the monitoring unit 18. Suitably, an O-ring or other seal 26 is used between each sensor plate 22 and the monitoring unit 18. Further, each sensor plate 22 may be secured to the monitoring unit 18 by at least one and preferably at least two latches 28. As seen in FIG. 7C, the latches 28 may be movable between a latched position (shown in solid lines) and an unlatched position (shown in phantom lines).

Again as shown in FIG. 7B, each sensor plate 22 preferably has the sensor electronics 30 attached thereto.

The sensors 24 are able to detect any number of different pathogens, chemicals, and biological contaminants.

Figure 8A:
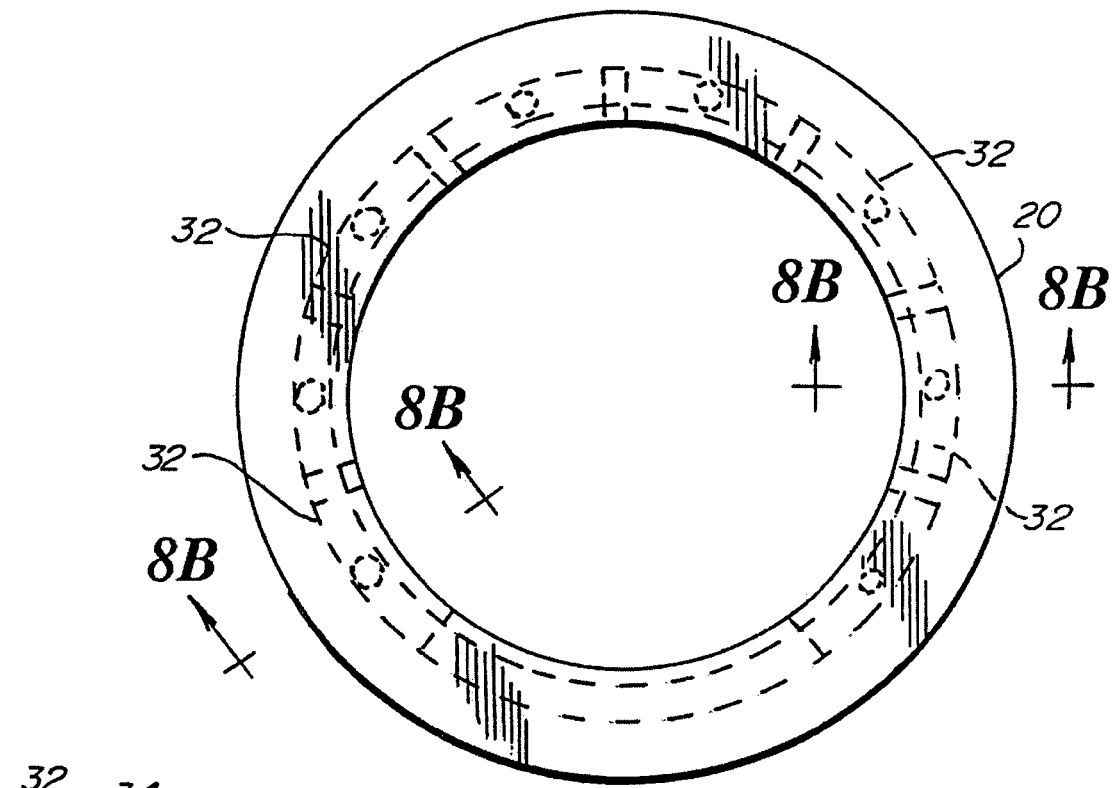
FIG. 8A is a schematic elevational view of the sampling unit of the present invention.
Figure 8B:
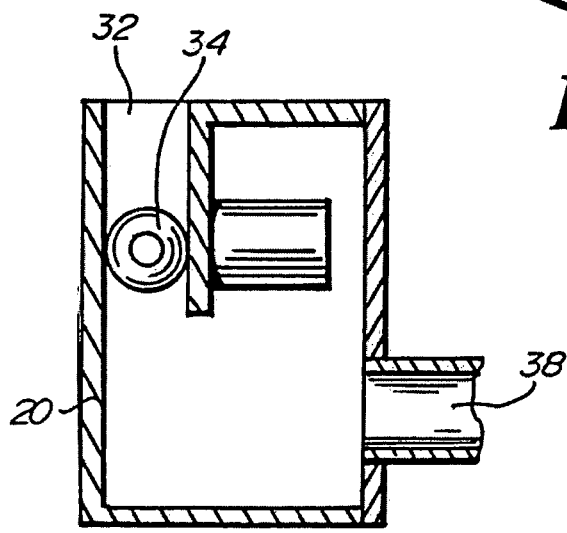
FIGS. 8B and 8C are cross-sections taken at approximately the lines 8B of FIG. 8A.
Figure 8C:
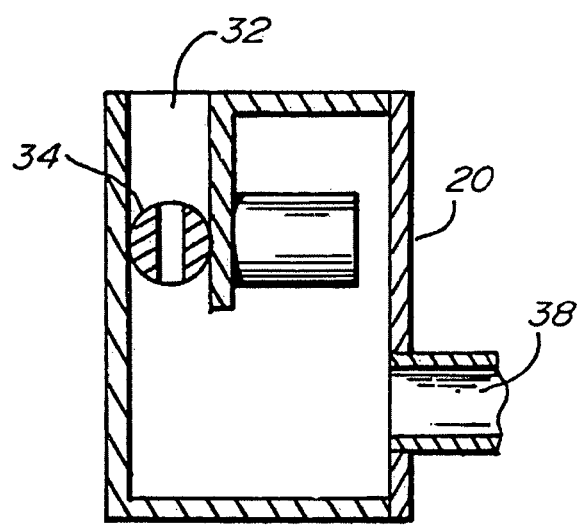

FIGS. 8A-8C show the sampling unit 20. Each sampling unit 20 further comprises a number of gates 32 and gate valves 34. Each gate 32 and gate valve 34 is in proximity to one of the sensors 24. Each of the gates 34 is connected to a collection pipe 38.

Figure 5:
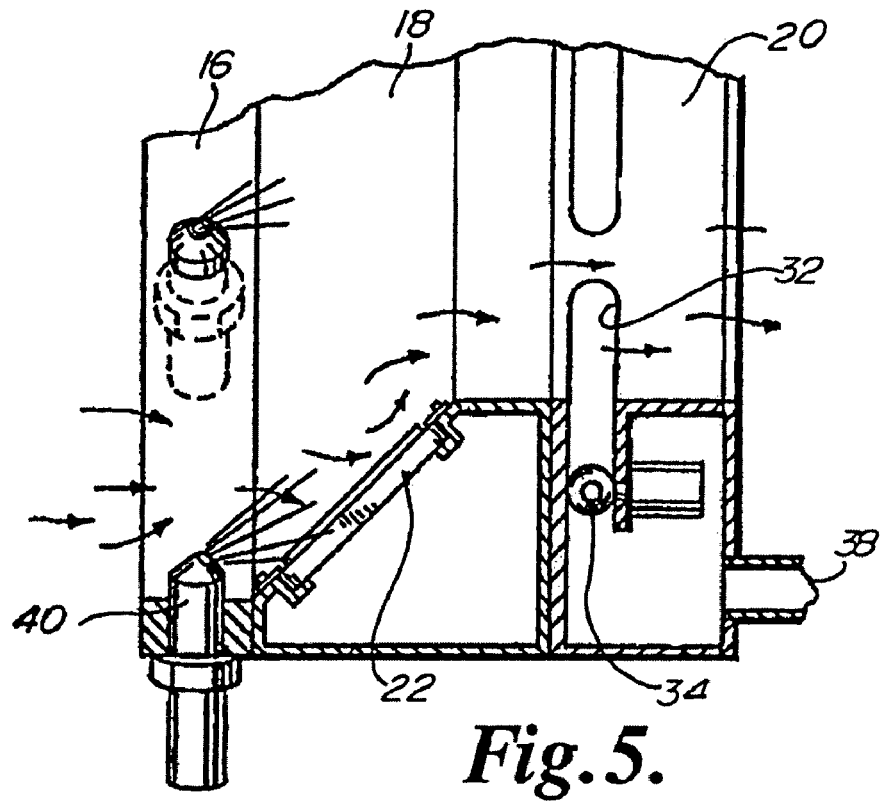
FIG. 5 is a schematic of fresh water flow through the components of FIG. 2 when a contaminant has not been detected.
Figure 6:
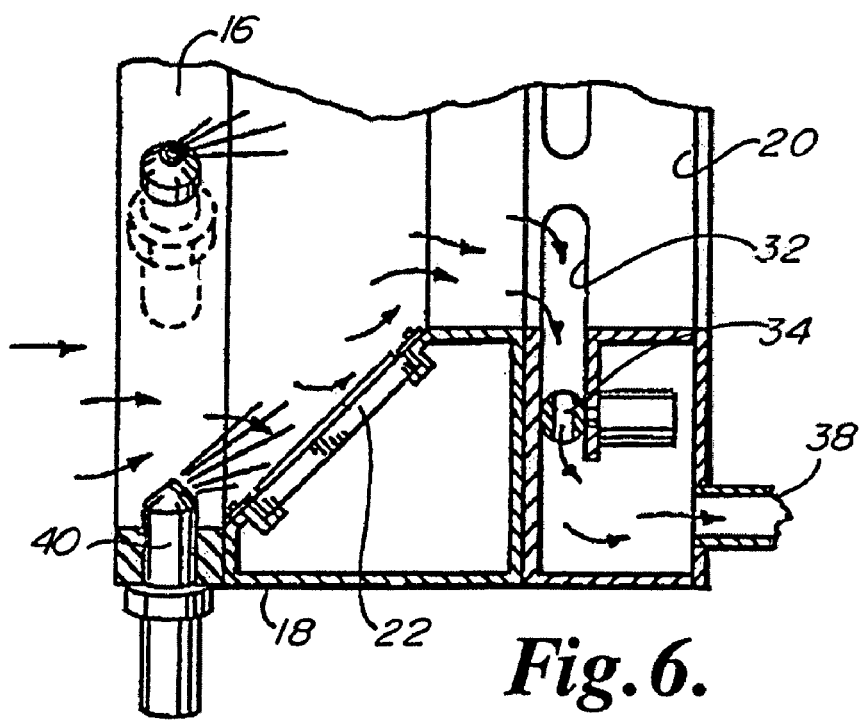
FIG. 6 is similar to FIG. 5, but shows fresh water flow when a contaminant has been detected.

FIGS. 5 and 6 should now be viewed. As can be seen, the propulsion unit 16 further comprises at least one spray nozzle 40 associated with each sensor plate 22. Each spray nozzle 40 directs a stream of water against the associated sensor plate 22 to prevent any contaminants, but in particular zebra mussels, from clinging to the sensor plate 22.

FIG. 11 shows the collection unit 42. The collection unit 42 further comprises a discharge pipe 39, at least one and preferably a number of flow switches or diverters 44, a collection tank 46 associated with each diverter 44, and an optional sewer drain 48. Each collection tank 46 also has a float switch 47.

Figure 10:
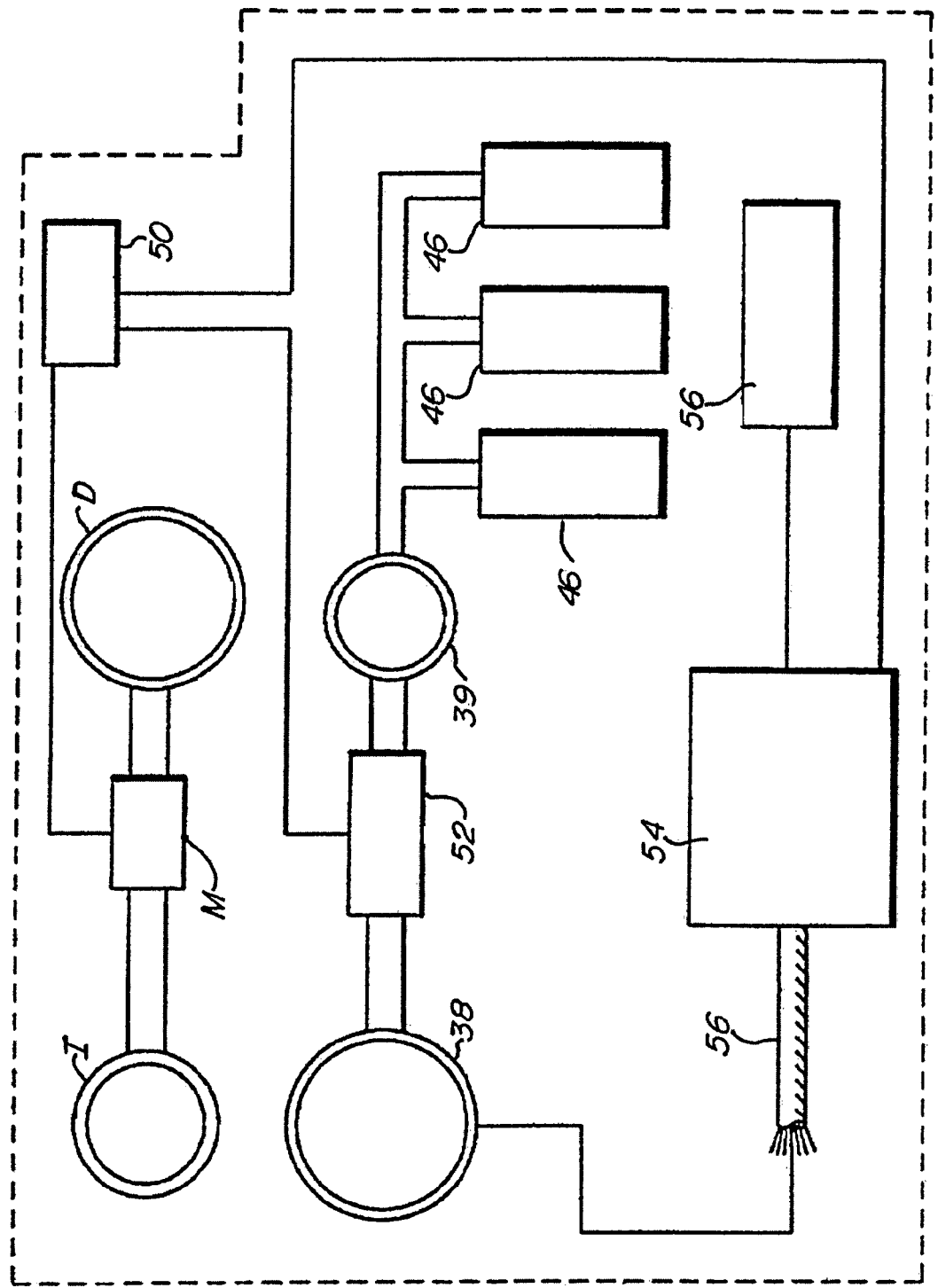
FIG. 10 is a system overview block diagram of the present invention.

FIG. 10 shows a system overview. A transfer switch 50 is connected to the main pump M, which takes water from the intake pipe I and pumps it into the public discharge pipe D. The transfer switch 50 is also connected to a collection pump 52 and to a monitoring panel 54. The monitoring panel 54 is connected by any suitable method such as telephone, cable, or wireless transmission to a communications monitoring company 56. The monitoring panel 54 is also connected by a wire harness 56 or other suitable connection to the sensor plates 22.

Operation of the system will now be described (see FIGS. 1, 5, 6, and 12).

FIG. 1 shows a general overview of the placement of the system within a municipal fresh water intake system, which consists of a pump house H with a pump P. The pump house H is typically located near the shore of a large body of fresh water W, such as a reservoir or lake. The pump is connected to an intake pipe I which draws fresh water from the body of water W and in turn pumps the fresh water into the municipality's distribution system (not shown). The invention 10 is inserted in at least one and preferably several locations along the intake pipe I.

All water flowing through the intake pipe I, which may be 30 feet or more in diameter, passes along the sensor plates 24 of the monitoring unit 18. FIG. 5 shows the flow of water that is being monitored. After passing over the monitoring unit 18, the water typically continues on through the intake pipe I, because the gate valves 34 are closed.

When a contaminant is detected by a sensor on one of the sensor plates 24, the sensor 22 sends a signal to the monitoring panel 54. Appropriate logic then determines whether the contaminant is of a type to present a possible hazard. If so, the logic sends a signal to the transfer switch 50, which in turn causes the main pump M to shut down, causing water in the intake pipe I to stop passing to the discharge pipe D. Simultaneously, the transfer switch 50 sends a signal to the collection pump 52 and to the gate valve 34 associated with the triggered sensor 22, causing the gate valve 34 to open and divert a sample of water through the associated gate 32, as shown in FIG. 6. Water then flows into the collection pipe 38 and is pumped by the collection pump 52 through the discharge pipe 39 into the collection tanks 46. If a series of collection tanks 46 is used, samples of successively more diluted water will be stored in the collection tanks 46. As each collection tank 46 is filled, the float switch 47 signals the associated diverter 44 to close, causing water to stop being collected in that collection tank.

There is no requirement that the monitoring and containment facilities 12 be co-located with or near the collection units 42. The intake pipe I may be several miles long, with a number of the facilities 12 interspersed along its length, while the collection unit 42 is on shore.

In the event that the collection unit 42 is located a substantial distance from the monitoring and containment facility 12 that detected the contaminant, all water in the pipe I between the detected contaminant and the collection unit 42 must be prevented from entering the collection tanks 46. Therefore, this excess water is diverted to the sewer drain 48.

The monitoring panel 54 also sends a signal to the communications monitoring company 56. This may cause an alert to be sounded and monitoring data to be transmitted to a regulatory agency and the Department of Homeland Security.

Optionally, the video camera 14 may be activated to record terrorist activity either at the surface S of the water W, or in the vicinity of the intake pipe I.

Figure 12:
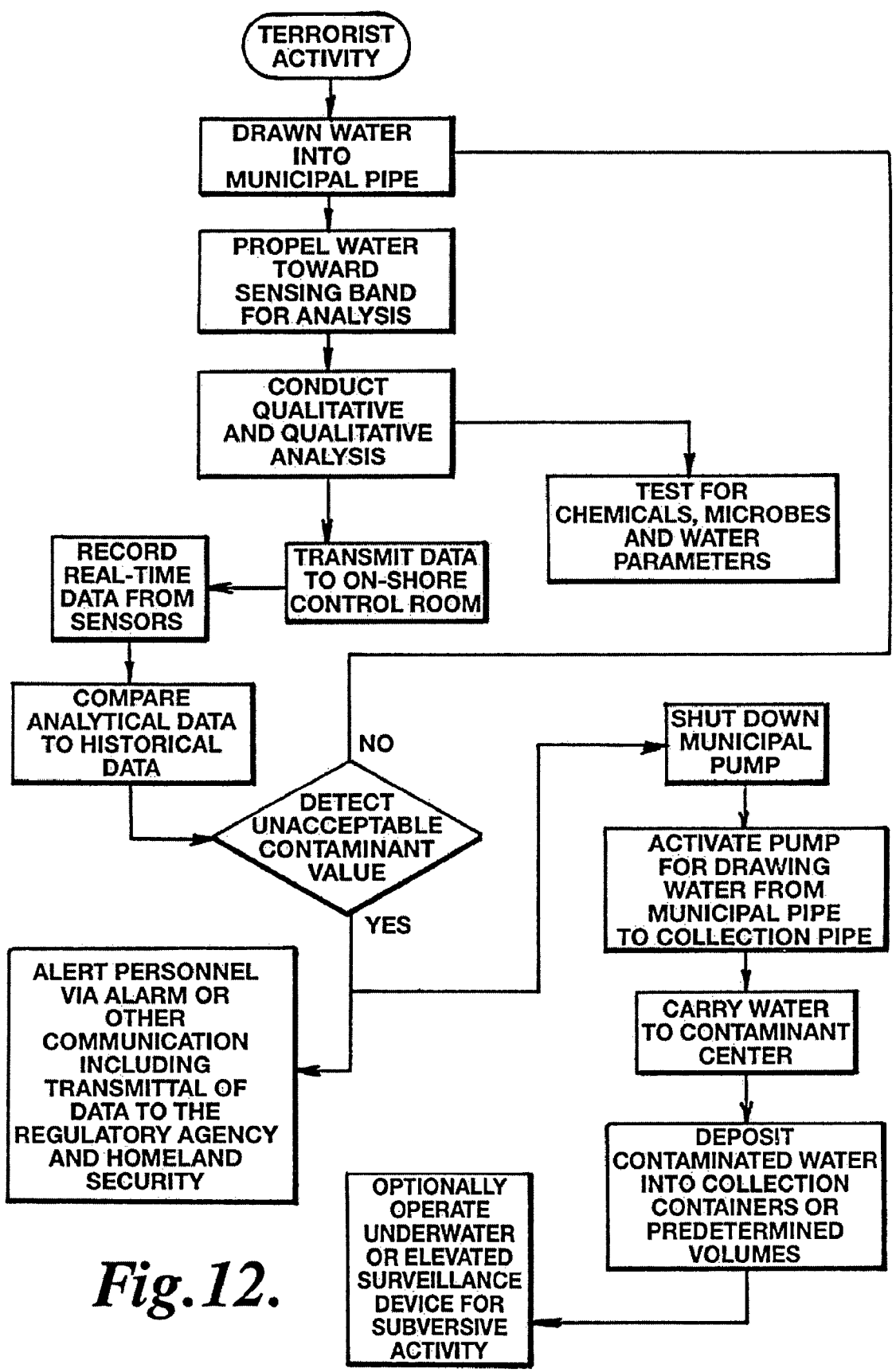
FIG. 12 is a flowchart of the present invention.

In another aspect, as shown in FIG. 12, the present invention comprises a method of detecting the presence of a contaminant in a fresh water intake pipe, comprising the steps of:

passing the water against a sensor;

transmitting data from the sensor to an analyzer;

conducting qualitative and quantitative analysis on the data from the sensor; and preventing further intake of water if a contaminant value is determined to be unacceptable.

The method may also comprise the step of alerting an authority to the presence of the contaminant.

The method may also comprise the step of collecting a water sample from the vicinity of the sensor and depositing the water sample in a container.

The method may also comprise the step of operating a surveillance device in the vicinity of the sensor.

The step of preventing further intake of water may also comprise shutting down a pump.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive.

What is claimed:

1. A system for continuously monitoring the intake of a fresh water system to detect and contain a hazard, the system having an intake pipe, the apparatus comprising:
   (a) at least one hazard-detector within the intake pipe sensing the presence of a hazard in the water in the intake pipe;
   (b) a sampling unit associated with the at least one hazard-detector, the sampling unit further comprising a gate and gate valve in proximity to the at least one hazard-detector, the gate and gate valve diverting a sample of water to a collection unit when a hazard is detected; and
   (c) a shut-off valve for simultaneously with diverting the sample shutting off further water intake in the intake pipe when a hazard is detected.

2. The system of claim 1, further comprising a signaling apparatus for notifying an authority when a hazard has been detected.

3. The system of claim 1, further comprising a surveillance apparatus for sensing human activity in the vicinity of the hazard detector.

4. The system of claim 1, wherein the hazard detector further comprises a monitoring unit within the intake pipe, with water flowing through the monitoring unit.

5. The system of claim 4, wherein the monitoring unit further comprises at least one hazard sensor.

6. The system of claim 5, wherein each of the at least one hazard sensors is interchangeable on the monitoring unit.

7. The system of claim 6, wherein each of the at least one hazard sensors is arranged on plates removably connected to the monitoring unit.

8. The system of claim 1, wherein the collection unit further comprises a discharge pipe connected to the collection pipe, at least one diverter connected to the discharge pipe, and a collection tank associated with each diverter.

9. The system of claim 8, wherein the collection unit further comprises a float switch in each collection tank.

10. The system of claim 9, wherein the collection tanks serially collect water from the discharge pipe.

11. The system of claim 10, further comprising a monitoring and containment facility receiving water from the collection unit and a sewer drainpipe removing all water between the collection unit and the monitoring and containment facility.

12. The system of claim 5, further comprising a controller responsive to signals from the hazard sensors, the controller determining the presence or absence of hazards based on the signals from the hazard sensors, and the controller signaling the sampling unit to open the gate valve, thereby diverting water to the collection unit when a hazard is detected.

13. The system of claim 12, wherein the controller sends a signal to an authority via the signaling apparatus, thereby notifying the authority of the detection of a hazard.

14. The system of claim 12, wherein the controller further comprises a transfer switch connected to a main pump pumping water through the intake pipe, the transfer switch being connected to a monitoring panel, the monitoring panel being connected to each sensor, the controller signaling the transfer switch to shut off the main pump when a hazard is detected.

15. The system of claim 7, further comprising a propulsion unit associated with each plate and spraying water onto the plate to prevent contaminants from clinging to the plate.

16. A method of detecting the presence of a contaminant in a fresh water intake pipe, comprising the steps of:
   (a) passing the water against a sensor;
   (b) transmitting data from the sensor to an analyzer;
   (c) conducting qualitative and quantitative analysis on the data from the sensor;
   (d) collecting a water sample from the vicinity of the sensor and depositing the water sample in a container; and
   (e) preventing further intake of water if a contaminant value is determined to be unacceptable.

17. The method of claim 16, further comprising the step of alerting an authority to the presence of the contaminant.

18. The method of claim 17, further comprising the step of collecting a water sample from the vicinity of the sensor and depositing the water sample in a container.

19. The method of claim 18, further comprising the step of operating a surveillance device in the vicinity of the sensor.

20. The method of claim 16, wherein the step of preventing further intake of water comprises shutting down a pump.

* * * * *